United States Patent
Dudney et al.

(10) Patent No.: US 10,263,246 B2
(45) Date of Patent: Apr. 16, 2019

(54) LITHIATED AND PASSIVATED LITHIUM ION BATTERY ANODES

(71) Applicant: UT-Battelle, LLC, Oak Ridge, TN (US)

(72) Inventors: Nancy J. Dudney, Knoxville, TN (US); Edward W. Hagaman, Oliver Springs, TN (US); Gabriel M. Veith, Knoxville, TN (US); Lance W. Gill, Oak Ridge, TN (US); Robert L. Sacci, Ringgold, GA (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 394 days.

(21) Appl. No.: 14/947,687

(22) Filed: Nov. 20, 2015

(65) Prior Publication Data

US 2016/0218351 A1    Jul. 28, 2016

Related U.S. Application Data (60) Provisional application No. 62/082,305, filed on Nov. 20, 2014.

(51) Int. Cl.
*H01M 10/42* (2006.01)
*H01M 10/0569* (2010.01)
(Continued)

(52) U.S. Cl.
CPC ......... *H01M 4/133* (2013.01); *H01M 4/0404* (2013.01); *H01M 4/0445* (2013.01);
(Continued)

(58) Field of Classification Search
CPC ........ H01M 4/133; H01M 4/587; H01M 4/62; H01M 4/622; H01M 10/0525; H01M 10/058
See application file for complete search history.

(56) References Cited

U.S. PATENT DOCUMENTS

| | | |
|---|---|---|
| 5,565,284 A | 10/1996 | Koga et al. |
| 5,589,297 A | 12/1996 | Koga et al. |
| (Continued) | | |

FOREIGN PATENT DOCUMENTS

| | | | | |
|---|---|---|---|---|
| JP | 2001-006729 | * | 1/2001 | ............ H01M 10/40 |
| JP | 2005-166469 | * | 6/2005 | .............. H01M 4/02 10/4 |
| WO | 2010135248 A1 | | 11/2010 | |

OTHER PUBLICATIONS

Kearley et all.: "Structure, vibrational-dynamics and first-principles study of diglyme as a model system for poly (ethyleneoxide)", Solid State Ionics 147 (2002) 237-242.
(Continued)

*Primary Examiner* — Osei K Amponsah
(74) *Attorney, Agent, or Firm* — Fox Rothschild LLP (57) ABSTRACT

An electrode material includes a lithium active material composition. The lithium active material composition includes lithium and an active anode material. The lithium active material composition is coated with a lithium ion conducting passivating material, such that the electrode material is lithiated and pre-passivated. An electrode and a battery are also disclosed. Methods of making an electrode material, electrode and battery that are lithiated and pre-passivated are also disclosed.

13 Claims, 9 Drawing Sheets

(51) Int. Cl.
| | |
|---|---|
| H01M 10/0525 | (2010.01) |
| H01M 10/0585 | (2010.01) |
| H01M 10/0568 | (2010.01) |
| H01M 4/133 | (2010.01) |
| H01M 4/62 | (2006.01) |
| H01M 4/04 | (2006.01) |
| H01M 4/13 | (2010.01) |
| H01M 4/139 | (2010.01) |
| H01M 4/36 | (2006.01) |
| H01M 4/587 | (2010.01) |
| H01M 10/058 | (2010.01) |

(52) U.S. Cl.
CPC ............. *H01M 4/13* (2013.01); *H01M 4/139* (2013.01); *H01M 4/366* (2013.01); *H01M 4/62* (2013.01); *H01M 4/622* (2013.01); *H01M 4/587* (2013.01); *H01M 10/058* (2013.01); *H01M 10/0525* (2013.01)

(56) References Cited

U.S. PATENT DOCUMENTS

| | | | |
|---|---|---|---|
| 5,595,837 | A | 1/1997 | Olsen et al. |
| 5,759,715 | A | 6/1998 | Barker et al. |
| 8,077,071 | B2 | 12/2011 | Cincotti et al. |
| 8,158,282 | B2 | 4/2012 | Zhamu et al. |
| 8,852,461 | B2 | 10/2014 | Liu et al. |
| 9,214,668 | B2 | 12/2015 | Liu et al. |
| 9,748,599 | B2 | 8/2017 | Grant et al. |
| 2006/0257743 | A1* | 11/2006 | Kuratomi ............... H01M 4/505 429/223 |
| 2008/0274408 | A1 | 11/2008 | Jarvis |
| 2009/0035663 | A1 | 2/2009 | Yakovleva et al. |
| 2011/0081575 | A1 | 4/2011 | Voelker et al. |
| 2011/0241546 | A1 | 10/2011 | Blandford, III |
| 2012/0107680 | A1 | 5/2012 | Amiruddin et al. |
| 2013/0003261 | A1 | 1/2013 | Remizov et al. |
| 2013/0045427 | A1 | 2/2013 | Zhamu et al. |
| 2013/0224598 | A1* | 8/2013 | Kameda ................ H01M 4/587 429/231.8 |
| 2013/0327648 | A1 | 12/2013 | Grant et al. |
| 2014/0245599 | A1 | 9/2014 | Voelker et al. |
| 2015/0280222 | A1 | 10/2015 | Kirkengen |

OTHER PUBLICATIONS

Aurbach et al.: "On the role of water contamination in rechargeable Li batteries", Electrochim. Acta 1999, 45 (7), 1135-1140.
Daumas et al., C.R. Acad. Sci. C 1969, 286, 373.
Conrad et al.: Resonance Magnetique Nucleaire du Lithium Interstitiel dans le Graphite. Mater. Sci. Eng. 1977, 31, 173-176.
Letellier et al.: "In situ 7Li nuclear magnetic resonance observation of the electrochemical intercalation of lithium in graphite; 1st cycle", Carbon 2007, 45, 1025-1034, in situ NMR of LiCx electrochemical.
Dahn, J. R. "Phase Diagram of LixC6", Phys. Rev. B 1991, 44 (7), 9170-9177.
Raynier, et al.: "XRD evidence of macroscopic composition inhomogeneities in the graphite-lithium electrode", Journal of Power Sources 2007, 165 (2), 616-619.
Mordkovich , V. Z. Synthesis and XPS investigation of superdense lithium-graphite intercalation compound, LiC2, Synthetic Metals, 1996, 80, 243.
Bagouin, M.; Guerard, D.; Herold, A. CR Acad. Sci. C Chim. 1966, 262, 557.
Conrad et al.: "Lithium NMR in Lithium-Carbon Solid State Compounds. In New Trends in Intercalation Compounds for Energy Storage", NATO Science Series; Springer Netherlands, 2002; vol. 61, pp. 77-93.
Billaud et al.: "Revisited Structures of Dense and Dilute Stage II Lithium-Graphite Intercalation Compounds", Phys. Chem. Solids 1996, 57, 775.
Billaud et al.: "A. New Results Concerning the Lithium-Pyrographite System", Synthetic Metals 1981, 3, 21-26.
Persson et al., J. Phys. Chem. Lett. 2010, 1, 1176-1180.
Persson et al.: "Thermodynamic and kinetic properties of the Li-graphite system from first-principles calculations", Phys. Rec. B 2010, 82, 125416.
Zaghib et al.: "7Li-NMR of Well-Graphitized Vapor-grown carbon fibers and natural graphite negative electrodes of rechargeable lithium-ion batteries", J. Electrochem. Soc. 1999, 146, 2784-2793.
Dai et al.: Lithium-7 Nuclear Magnietic Resonance Investigation of Lithium Insertion in Hard Carbon. J. Electrochem. Soc. 1988, 145, 1179-1183.
Wang et al.: "7Li nuclear magnetic resonance study of lithium insertion in pristine and partially oxidized graphite", Journal of Power Sources 2001, 94 (2), 230-237.
Levi, M. D.; Aurbach, D. The mechanism of lithium intercalation in graphite film electrodes in aprotic media. Part 1. High resolution slow scan rate cyclic voltammetric studies and modeling. J. Electroanal. Chem. 1997, 421 (1), 79-88.
Levi, M. D.; Levi, E. A.; Aurbach, D. The mechanism of lithium intercalation in graphite film electrodes in aprotic media. Part 2. Potentiostatic intermittent titration and in situ XRD studies of the solid-state ionic diffusion. J. Electroanal. Chem. 1997, 421 (1-2), 89-97.
Kirczenow, G. Dynamics of pattern formation in layered materials: computer, simulations of intercalation and deintercalation. Can. J. Phys. 1988, 66, 39-61.
Regan, B. C. et al.: "In situ transmission electron microscopy of the electrochemical intercalation of graphite in sulfuric acid", Microsc. Microanal. 2014, 20 (Suppl 3), 1528-1529.
Imanishi, N.; Kumai, K.; Kokugan, Y.; Takeda, Y.; Yamamoto, O. 7Li-NMR study of carbon fiber and graphite anodes for lithium ion batteries. Solid State Ionics 1998, 107, 135-144.
B Fortunato, P Mirone, G. Fini, Spectrochim. Acta, 1971, 27A, 1917.B Fortunato, P Mirone, G. Fini, Spectrochim. Acta, 1971, 27A, 1917.
A. Hinde, J. Appl. Crystallogr. 2004, 37(6), 1020.
M. Moshkovich,, Y. Gofer, and D. Aurbach, J. Electrochem. Soc., 2001, 148(4), E155.
Bridges et al.: "In Situ Observation of Solid Electrolyte Interphase Formation in Ordered Mesoporous Hard Carbon by Small-Angle Neutron Scattering",J. Phys. Chem. C, 2012, 116 (14), pp. 7701-7711.
Sacci et al.: "Dry Synthesis of Lithium Intercalated Graphite Powder and Fiber", Journal of the Electrochemical Society, 161 (4) A614-A619 (2014).
Yakovleva et al.: "Stabilized Lithium Metal Powder, Enabling Material and Revolutionary Technology for High Energy Li-ion Batteries" 2010 DOE Vehicle Technologies Program Review, Jun. 8, 2010.
G.J. Kearley, P. Johansson, R.G. Delaplane, and J. Lindgren, Solid State Ionics, 2007, 147, 237.
G.V. Zhuang, K. Xu, H. Yang, T.R. Jow, and P.N. Ross, J. Phys. Chem. B, 2005, 109, 17567.
G.V. Zhuang, H. Yang, B. Blizanac, and P.N. Ross, Electrochem. Solid-State Let., 2005, 8(9), A441.
X. Zhang, R. Kostecki, T.J. Richardson, J.K. Pugh, and P.N. Ross, J. Electrochem. Soc., 2001, 148(12), A1341.
R.R. Unocic, X.-G. Sun, R.L. Sacci, L.A. Adamczyk, D.H. Alsem, S. Dai, N.J. Dudney, and K.L. More, Microsc. Microanal., 2014, 20, 1029.
R.L. Sacci, N.J. Dudney, K.L. More, L.R. Parent, I. Arslan, N.D. Browning, and R.R. Unocic,, Chem. Comm., 2014, 50, 2104.
Z. Zeng, W.-I. Liang, H.G. Liao, H.L. Xin, Y.H. Chu, and H. Zheng, Nano Lett., 2014, 14(4), 1745.

\* cited by examiner

LITHIATED AND PASSIVATED LITHIUM ION BATTERY ANODES

CROSS REFERENCE TO RELATED APPLICATIONS

This application claims priority to U.S. Provisional Patent Application No. 62/082,305, filed Nov. 20, 2014, titled "Operando NMR and XRD Study of Chemically-Synthesized LiCx Oxidation in a Dry Room Environment" the entire contents of which are incorporated herein by reference.

STATEMENT REGARDING FEDERALLY SPONSORED RESEARCH

This invention was made with government support under contract No. DE-AC05-00OR22725 awarded by the U.S. Department of Energy. The government has certain rights in this invention.

FIELD OF THE INVENTION

This invention relates generally to lithium batteries, and more particularly to materials and methods for making lithium battery electrodes.

BACKGROUND OF THE INVENTION

One of the fundamental questions confronting battery research regards the mechanism of the solid-electrolyte interphase's (SEI) formation. Typically, the SEI is formed during the initial charging of a battery, and when formed, it protects the anode from reacting with the electrolyte while allowing Li ions to migrate to and from the anode. This process contains three general reactions: 1) Li intercalation; 2) electrochemical reduction of electrolyte; and 3) chemical reduction of electrolyte by reduced Li.

Increasing the amount of Li is a known strategy for increasing performance and cycle life of re-chargeable Li-ion batteries. The excess lithium is used in preparation and maintenance of the solid electrolyte interphase (SEI) formed primarily at the anode surface during cycling. Industry typically accomplishes this by increasing the amount of cathode material or using lithium-rich materials. This strategy results in a significant amount of wasted cathode material, which decreases the energy density of the battery. Strategies for increasing the lithium content in batteries by producing pre-lithiated anode materials have been proposed, however, pre-lithiation presents inherent difficulties: 1) pre-lithiated materials are only 0.1-0.2 V more positive than Li metal and therefore are highly reductive; 2) they spontaneously react with most organic solvents, battery electrolytes and gaseous $O_2$ and $H_2O$ exothermically; and 3) they produce a passivation layer upon contact with the aforementioned chemicals of lithium carbonate, fluoride and oxide, and polycarbonates. Confronting processing problems of reactive pre-lithiated anodes is important for providing alternate means to improve battery performance by increasing Li loading or allowing for SEI synthesis.

SUMMARY OF THE INVENTION

An electrode material includes a lithium active material composition. The lithium active material composition includes lithium and an active anode material. The lithium active material composition is coated with a lithium ion conducting passivating material, such that the electrode material is lithiated and pre-passivated.

The active material can include at least one selected from the group consisting of C, Si, Sn, SnO, Sb, Mo—Sb, Cu—Sb, Cu—Sn, and $TiO_2$. The active material can include at least one selected from the group consisting of graphite and amorphous carbon.

The lithium active material composition can include at least one selected from the group consisting of $LiC_6$, $LiC_{12}$, $LiC_{18}$, $LiC_3N_4$, $Li_xSi$ where $0<x<4$, $LiTi_2C_3$, and LixSn, and LixSb.

The lithium ion conducting passivating material can include at least one selected from the group consisting of ethylene carbonate, propylene carbonate, fluoroethylene carbonate and vinylene carbonate. The lithium ion conducting passivating material can have a transference number of from 0.7 to 1.0.

The passivating coating can be less than 100 nm thick, and preferably less than 50 nm thick. The passivating coating can include at least one selected from the group consisting of lithium carbonate, lithium fluoride, polycarbonates such as polyethylene oxides, poly carbonates, and copolymers thereof; and lithium alkyl carbonate salts such as lithium alkyl carbonates including lithium alkyl dicarbonate, dilithium butylene dicarbonate, and all their fluorinated counter parts. Other possible lithium ion conducting passivating materials include sulfones, cyanides, acetonitrile, glymes (di, tri, tetraglyme) dioxolane and NMP.

The electrode material can further include an outer reflective coating over the passivating coating. The reflecting coating can include gold.

An electrode can include an electrode material. The electrode material can include a lithium active material composition. The lithium active material composition can be coated with a lithium ion conducting passivating material. A binder can be provided for binding the electrode material together to form a lithiated and pre-passivated electrode. The lithium ion conducting passivating material can have a transference number of from 0.7 to 1.0.

The binder can be UV curable. The binder can include at least one selected from the group consisting of polyvinylidene fluoride (PVDF) ethylene propylene diene terpolymer (EPDM), carboxymethylcellulose, chlorinated PVDF, and polytetrafluoroethylene.

The active material can include at least one selected from the group consisting of C, Si, Sn, SnO, and $TiO_2$. The lithium active material composition can include at least one selected from the group consisting of $LiC_6$, $LiC_{12}$, $LiC_{18}$, $LiC_3N_4$, and $Li_xSi$ where $0<x<4$ and $LiTi_2C_3$.

The electrode can further include an outer reflective coating over the passivating coating.

A battery can include a lithiated and pre-passivated anode comprising an electrode material, comprising a lithium active material composition. The lithium active material composition can be coated with a lithium ion conducting passivating material. The anode can further include a binder and a current collector. A cathode, a separator, and an electrolyte can also be provided.

A method of making an electrode material can include the step of reacting Li with an active anode material to form a lithium active material composition. The lithium active material composition can be coated with a lithium ion conducting passivating material to provide a lithiated and pre-passivated electrode material. The method can further include the step of applying an outer reflective coating over the passivating coating.

A method of making an electrode can include the step of reacting Li with an active anode material to form a lithium active material composition. The lithium active material composition can be coated with a lithium ion conducting passivating material to provide an electrode material. The electrode material can be mixed with a binder. The binder and electrode material can be applied to a current collector. The binder can be cured to adhere the electrode material together and to the current collector to form a lithiated and pre-passivated electrode.

The binder can be cured by the application of UV light. A solvent for the binder can be included in the mixing step, and the method can further include the step of evaporating the solvent prior to the step of curing the binder. The binder can include at least one selected from the group consisting of polyvinylidene fluoride (PVDF) and ethylene propylene diene terpolymer (EPDM). The solvent can be at least one selected from the group consisting of organic carbonate, ketone, ester, ether and furan. The solvent can be at least one selected from the group consisting of cyclohexane, N-methyl-2-pyrrolidone (NMP), ethylene carbonate, dimethyl carbonate, propylene carbonate, and tetrahydrofuran. The lithium ion conducting passivating material can have a transference number of from 0.7 to 1.0.

A method of making a battery can include the step of reacting Li with an active anode material to form a lithium active material composition. The lithium active material composition can be coated with a lithium ion conducting passivating material to provide an electrode material. The electrode material can be mixed with a binder. The binder and electrode material can be applied to a current collector. The binder can be cured to adhere the electrode material together and to the current collector to form a lithiated and pre-passivated anode. The lithiated and pre-passivated anode can be assembled with a cathode, a separator, and an electrolyte to form a lithiated and pre-passivated battery. The method can further include the step of operating the battery without solid electrolyte interface (SEI) formation cycles.

A method of forming an anode can include the step of reacting Li with an active anode material to form a lithium active material composition. The lithium active material composition can be mixed with a binder. The binder can be cured to form an electrode material. The method can further include the step of applying a coating of a lithium ion conducting passivating material to the electrode material.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

An electrode material according to the invention includes a lithium active material composition. The lithium active material composition includes and in some embodiments can consist or consist essentially of lithium and an active anode material. The lithium active material composition is coated with a lithium ion conducting passivating material. The electrode material is thereby lithiated and pre-passivated.

Figure 1:
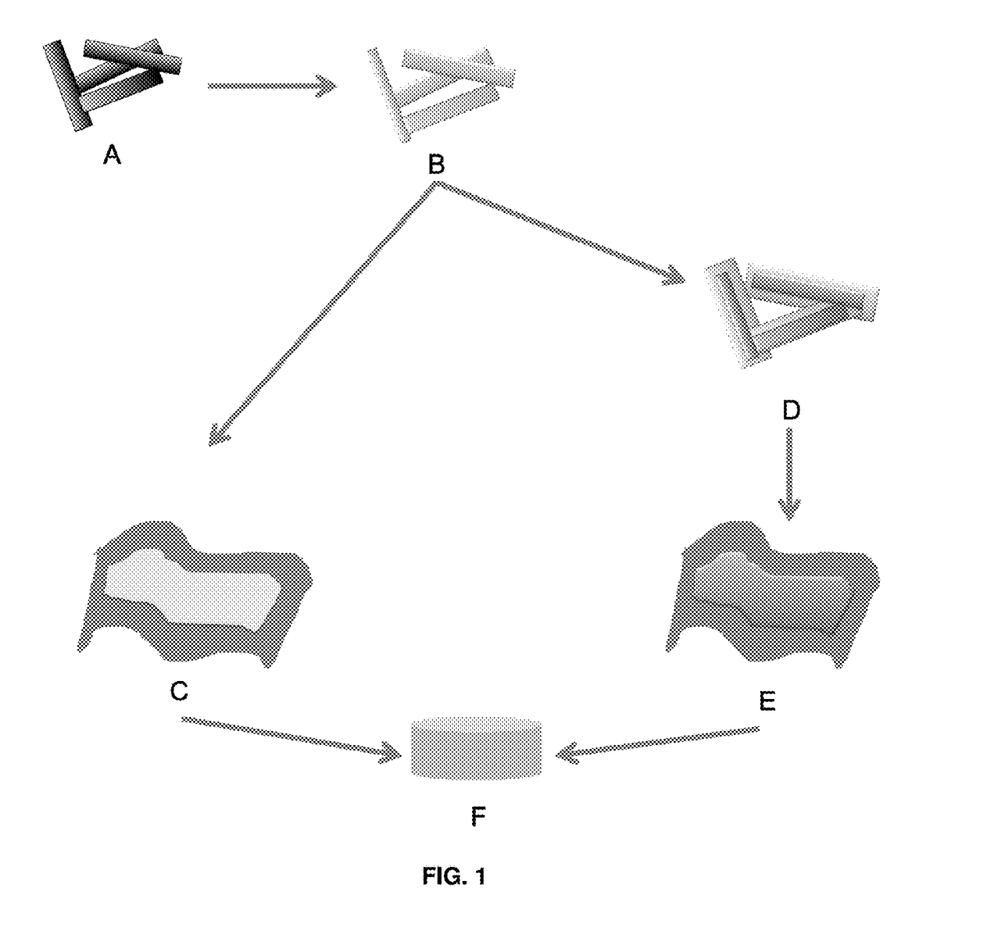
FIG. 1 is a schematic diagram depicting the process of the invention.

FIG. 1 is a schematic diagram depicting the process of the invention. These steps include starting with an anode material silicon, graphite, $TiO_x$, in step A. Chemical lithiation by thermal evaporation or mechanical mixing is shown in step B. Thermal evaporation preserves original particle morphology, while mechanical is faster. There are then 2 options. The product of chemical lithiation can be mixed with inert binder to cast an unpassivated anode, as shown in step C. After forming and curing the porous electrode with lithiated graphite or other anode materials, the entire electrode can then be reacted with vapors or liquids to form the artificial passivating SEI layer. Alternatively, the product of chemical lithiation can be mixed with organic solvent to passivate the anode surface, in step D. The coating conducts Li ions. The lithiated material is mixed with binder to cast a passivated anode, in step E. The electrodes are then used to assemble the battery in step F.

Pre-passivation as used herein refers to passivation of the reactive lithium active material before being incorporated into the battery. The pre-passivation of the invention eliminates the long and restrictive passivation of the newly formed battery to form a protective SEI that has been the standard process in the industry, and makes the lithium active material composition more stable in air so it can be handled and processed in a dry room.

The active material can be any suitable active material that provides an effective electrochemical potential suitable for a battery anode, less than about 1.8V versus the Li/Li+ reference, when lithiated. Suitable active materials can include C, Si, Sn, SnO, Sb, Mo—Sb, Cu—Sb, Cu—Sn, and $TiO_2$, and possibly also mixtures thereof. The active material can be one selected from various carbonaceous active materials, including graphite and amorphous carbon. Other active materials are possible.

The lithium active material composition is the reaction product of lithium with the active material. The lithium active material composition can include $LiC_6$, $LiC_{12}$, $LiC_{18}$, $LiC_3N_4$, $Li_xSi$ where $0<x<4$, and $LiTi_2C_3$, $Li_xSn$, and $Li_xSb$. Other lithium active material compositions are possible.

The stability of pre-lithiated graphite anodes was tested for Li-ion batteries in a dry room battery processing room. The reaction between $LiC_x$ and laboratory air was followed using operando NMR and x-ray diffraction as these methods are sensitive to change in Li stoichiometry in graphite. There is minimal reactivity between $LiC_6$ and $N_2$, $CO_2$ or moistureless $O_2$; however, $LiC_6$ reacts with moisture to form lithium hydroxides (e.g., $Li_2O$, $LiOH$, $LiOH.xH_2O$, etc.). The reaction rate follows zero-order kinetics with respects to intercalated lithium suggesting that lithium transport through the graphite is fast. The reaction occurs by sequential formation of higher stages—$LiC_{12}$, then $LiC_{18}$, and then $LiC_{24}$—as the hydrolysis proceeds to the formation of $Li_xOH_y$ and graphite end products. Slowing down the formation rate of the $Li_xOH_y$ passivation layer stabilizes of the higher stages.

The lithium ion conducting passivating material is one that inhibits or eliminates the transport of gas or liquid to the reactive lithium active material composition, and inhibits or eliminates the transport of electrons. The passivating material in addition allows for Li ions to move through it with a transference number between 0.7 and 1.0. The transference number is the ratio of components that are migrating through the lithium ion conducting passivating material. In the case of an ion conductor, the best ion conductor is one where only the desired ion in the system (in the present case, Li) is able to move throughout the conductor. In this case the transference number would be 1, or for all the ions that move through the passivating material 100% of them were Li. A transference number of 0.7 would mean that 70% of the ions that move through the passivating material are Li.

The lithium ion conducting passivating material can be at least one selected from the group consisting of ethylene carbonate, propylene carbonate, fluoroethylene carbonate and vinylene carbonate. The lithium ion conducting passivating material can include lithium carbonate, lithium fluoride, polycarbonates such as polyethylene oxides, poly carbonates, and copolymers thereof; and lithium alkyl carbonate salts such as lithium alkyl carbonates including lithium alkyl dicarbonate, dilithium butylene dicarbonate, and all their fluorinated counter parts. Other possible lithium ion conducting passivating materials include sulfones, cyanides, acetonitrile, glymes (di, tri, tetraglyme) dioxolane and NMP. Mixtures of different passivating materials are also possible. Other lithium ion conducting passivating materials are possible. The lithium ion conduction passivating material can comprises at least one selected from the group consisting of various solvent molecules and a lithium salt such as lithium hexafluorophosphate, lithium tetrafluoroborate, lithium perchlorate, a lithium trifluorisulfonyl imide.

The lithium ion conducting passivating material is preferably applied as a complete coating over the lithium active material composition without gaps or voids which would permit access to the reactive lithium active material composition. The lithium ion conducting passivating material coating can be as thin as sub nanometer, <1-3 nanometers, and can be less than 100 nm thick, and preferably less than 50 nm thick.

An electrode according to the invention includes an electrode material. The electrode material includes a lithium active material composition. The lithium active material composition is coated with a lithium ion conducting passivating material. A binder is provided for binding the electrode material together to form a lithiated and pre-passivated electrode.

A suitable binder maintains physical and electronic contact of the particles of active material to each other and to the metal current collector and to the conductive particles, if used, while allowing good access of the liquid electrolyte to a large fraction of the electrode material surface area. The binder provides mechanical strength and physical stability to the porous lithium ion passivating material coating even when the particles are going through a volume change during cycling of the battery. Some binders are themselves good electronic conductors, which eliminates or reduces the need for conductive particles. Others are electronic insulators and conductive additives can be provided to improve conductivity. The binder may be a dry material or may be applied with a solvent. Suitable binders can be at least one selected from the group consisting of polyvinylidene fluoride (PVDF), ethylene propylene diene terpolymer (EPDM), carboxymethylcellulose, chlorinated PVDF, and polytetrafluoroethylene.

The solvent can be any suitable solvent for the binder. The solvent can be at least one selected from the group consisting of organic carbonate, ketone, ester, ether and furan. The solvent can be at least one selected from the group consisting of cyclohexane, N-methyl-2-pyrrolidone (NMP), ethylene carbonate, dimethyl carbonate, propylene carbonate, and tetrahydrofuran. Other solvents are possible including mixtures of solvents such as ethylene carbonate and dimethyl carbonate, ethylene carbonate:diethyl carbonate, propylene carbonate dimethoxy ethane, gamma butryl lactone: and various carbonate molecules. Mixtures of solvents and lithium salts are also possible for example mixtures of diethyl carbonate with lithium hexafluorophosphate, lithium tetrafluoroborate, lithium perchlorate, or lithium trifluorisulfonyl imide, to optimize the composition and conduction of the coating of the passivating material.

The electrode material can be an additive to the anode formulation. For example, mostly traditional graphite can be utilized and then add 10-50% of the prelithiated electrode material to compensate for SEI formation losses of Li. The invention can also have utility for Li-air batteries, Li-sulfur batteries, and sodium-based battery electrodes. Layered sodium cathodes (Na0.6MnO2) start out already Na deficient. The present invention could compensate for this deficiency.

An SEI can be made according to the invention by exposing to solvent vapors—for example, gaseous organic carbonates or moisture—in a sealed vessel or under flowing vapor for 1 minute, or at least ideally 5 minutes, at least 10 minutes, or up to 24 hours. The passivating material coating can be formed while heating to 50 or 100° C.

The passivating material coating can be formed by adding solvent and or solvent/salt to the lithium active material composition in a limiting amount, ideally enough to wet the lithium active material composition, or wet with enough to form 10 nm of passivation layer, or 20 nm of passivation layer, or 50 nm of passivation layer.

The powder could be milled to ensure good coating. The binder can be hardened by any suitable method appropriate for the binder. The binder may harden after the solvent is evaporated. The binder can be cured by UV treatment when it is added as a dry material with a minimum of solvent or no solvent. The UV curing protocol will be selected for the binder that is utilized.

Curing of the binder by UV treatment can present challenges for exposing interior portions of the binder to the UV.

The UV penetration of thick electrode coatings (100-300 µm) depends on the UV power and light adsorbing properties of the coating. With the typically black graphite and other darkly colored electrode active materials, the UV penetration through the electrode layer will be limited. However with electrode materials of lighter color, the UV penetration may be deeper, allowing processing of far thicker battery electrodes with the dry UV-curable binder process. Using $LiC_6$ which is a golden color, or $LiC_{12}$ which is reddish, provides for a deeper UV penetration than for the pure graphite material. Similarly some $Li_xSi$ compositions will provide higher UV penetration than others. The composition can be carefully optimized with one of the lithiation processes of the invention. In addition, anode materials can be coated very thinly with a reflective metal coating to enhance the UV penetration into the electrode coating for effective binding. Graphite powders for example can be coated with a thin layer of gold using sputter deposition in a vacuum system. The metal coating can be <10 nm. A wide range of materials and synthesis routes can be employed to achieve such a reflective coating. The electrode material can thereby further comprise an outer reflective coating over the passivating material coating to reflect some of the UV internally to reach and cure interior portions of the binder. The reflective coating can be any suitable UV reflective material that will not otherwise significantly affect battery performance. A suitable reflective coating can be gold, but other reflective coating materials are possible. The reflective coating does not have to completely coat the active material to be effective, even coverage of 10% of the active material surface can be sufficient, and can be very thin, averaging on the order of 0.1-10 nm.

A battery according to the invention can have several different suitable designs. The battery can include a lithiated and pre-passivated anode comprising an electrode material. The electrode material includes the lithium active material composition. The lithium active material composition is coated with the lithium ion conducting passivating material. The anode further includes a binder and a current collector. A suitable cathode, separator, and electrolyte are provided.

A method of making an electrode material can begin with the step of reacting Li with the active anode material to form a lithium active material composition. The lithium active material composition is coated with the lithium ion conducting passivating material to provide a lithiated and pre-passivated electrode material. The outer reflective coating can then be applied over the passivating coating if necessary.

The method of making an electrode can be varied. The electrode material is mixed with a suitable binder and possibly a solvent for the binder. The binder and electrode material are applied to a current collector. The solvent can be evaporated if present. The binder is cured to adhere the electrode material together and to the current collector to form a lithiated and pre-passivated electrode. The binder can be cured by the application of UV light if the binder is UV curable.

A method of making a battery can include the steps of assembling the anode together with a suitable cathode, separator, and electrolyte to form a lithiated and pre-passivated battery. The battery assembly process of the invention does not require solid electrolyte interface (SEI) formation cycles. The method can include the step of operating the battery without solid electrolyte interface (SEI) formation cycles, or with significantly reduced SEI formation cycles.

The step of applying the lithium ion conducting passivating material coating can also be performed after the lithium active material composition is mixed with a binder and the binder is cured to form the electrode. This process will also result in a pre-passivated anode electrode that does not require SEI formation cycles, or a reduced number and/or duration of SEI formation cycles.

The stability of $LiC_x$ in dry room battery processing conditions was assessed by following the reaction of $LiC_x$ with ambient air using operando nuclear magnetic resonance (NMR) and x-ray diffraction (XRD). During processing, $LiC_x$ may react with trace amounts of moisture present within the environment and the electrolyte to form an oxide-rich SEI as illustrated in FIG. 1. While $LiC_6$ can be readily made, it is a moisture getter and will rapidly delithiate to form a passivating layer. This layer was found to be composed mainly of lithium hydroxides ($Li_2O$, LiOH, LiOH×$H_2O$) and protects higher stages of lithiated graphite for over 24 h when exposed to ambient air. Therefore, controlled exposure to moisture or organic solvents after synthesis allows for safe handling of pre-lithiated anode materials for Li-ion battery processing.

Example of the mechanical synthesis of $Li_xC_6$. The carbon source was a mesophase graphite (MGP-A, Pred Materials) annealed under Ar(g) for 3 h at 500° C. and immediately transferred into an Ar atmosphere glovebox. Stabilized lithium metal powder (SLMP®, FMC Lithium) or lithium metal (99.9%, Sigma-Aldrich) was stored in the same glovebox and used as received. The graphite (3 g) and desired molar ratio of Li were added to a gas-tight high-density poly-ethylene container along with 10 g of dried $ZrO_2$ milling media (5 mm dia.). The container was then placed into a stainless steel bomb, sealed, locked into a SPEX 8000M mixer/mill, and shook vigorously for 1.5 h. Afterward, the container was brought back into the glovebox for further use.

Figure 2:
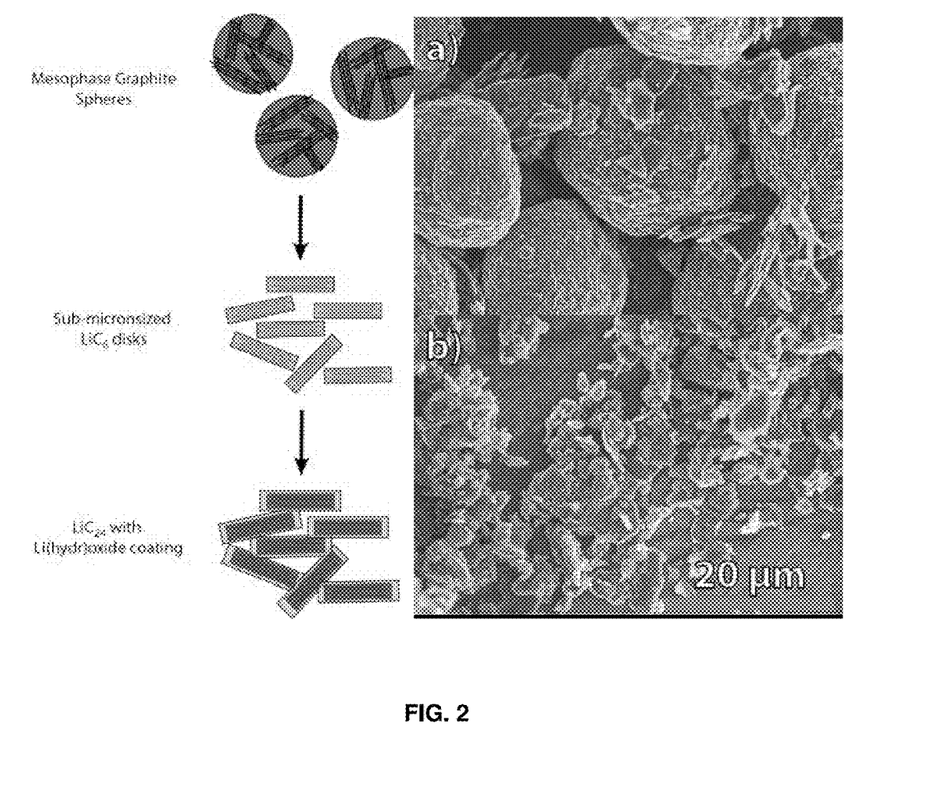
FIG. 2 is a schematic of prelithiation and passivation of the anode materials along with representative SEM images (right) of an (a) untreated graphite and (b) mechanically lithiated graphite.

The graphite particles, before and after mechanical lithiation (FIG. 2) were imaged using a Hitachi-S4800 scanning electron microscope (SEM) operating at 2 kV with a probing current of 10 µA. X-ray diffraction (XRD) samples were prepared in the glovebox by sealing powders between two 25 µm-thick Kapton® sheets using Tor Seal®. Measurements were made using an X'pert Pro diffractometer (PANalytic, Inc.) with Cu—Kα x-ray source operating at 45 kV and 40 mA. Scattering angles 10-100° (10-30° for time-resolved spectra) were collected in 0.02° steps with a count time of 0.4 s per step. The spectra were indexed with powder diffraction files (HighScore Plus, ICDD and COD) 96-101-1061 for graphite, 04-002-4997 for $LiC_6$, and 35-1046 for $LiC_{12}$.

Figure 3A:
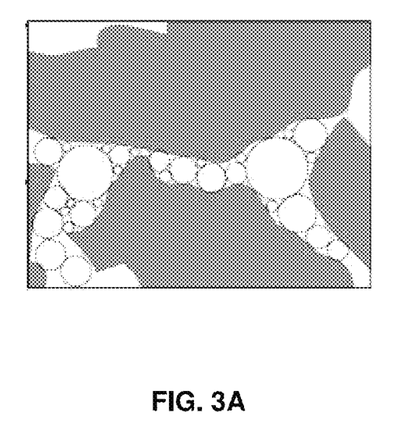
FIGS. 3A and 3B are depictions of the microscopic effects of the passivation treatment with and without binder present. The SEI causes agglomeration of the carbon particles and decreases the empty volume within the micropores.
Figure 3B:
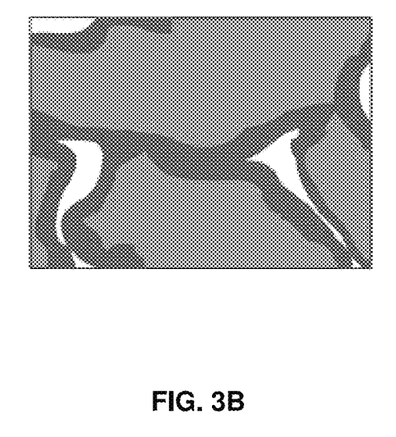

The schematic and SEM images in FIG. 3 show that milling crushes the spherical particles (20 um dia) into disks (10 µm dia.×1 µm thick), although crushing of the particles is not necessary for the invention. Milling also increases the BET specific surface area from 1 $m^2$ $g^{-1}$ to 90 $m^2$ $g^{-1}$, which increases the concentration of reactive sites for delithiation. The crystalline size judged by the (002) peak (related to the scattering peak's full width half maximum of the XRD peaks by the Scherrer equation) (6) in all the milled products—regardless of Li content—were near 180 Å.

$^7$Li NMR spectra were recorded on a 9.4T Bruker 400 Avance III NMR spectrometer operating at a $^7$Li resonance frequency of 155.57 MHz. Spectra typically were acquired at room temperature (295 K) using a one pulse experiment with minimum dead times delay (5 µs), a recycle delay of 10 s, and a 90° pulse optimized for the material. Chemical shifts were measured on samples whose height exceeds the NMR coil length by at least 1 cm and are reported with respect to an external 1 M LiCl(aq) solution: δ=0.

NMR samples were prepared in an argon-filled glovebox by sealing 0.3 g of sample in a standard 5 mm NMR tube using Torseal®. Samples sealed in this way are stable over a period of weeks. Controlled exposure to moisture was performed by introducing aliquots of selected gases by syringe injection into the NMR tube, displacing the argon cover gas. For these experiments the NMR tube was resealed with a tight-fitting plastic NMR cap that makes a gas-tight seal that protects the integrity of the sample over the time duration of the measurements up to several hours.

Figure 4A:
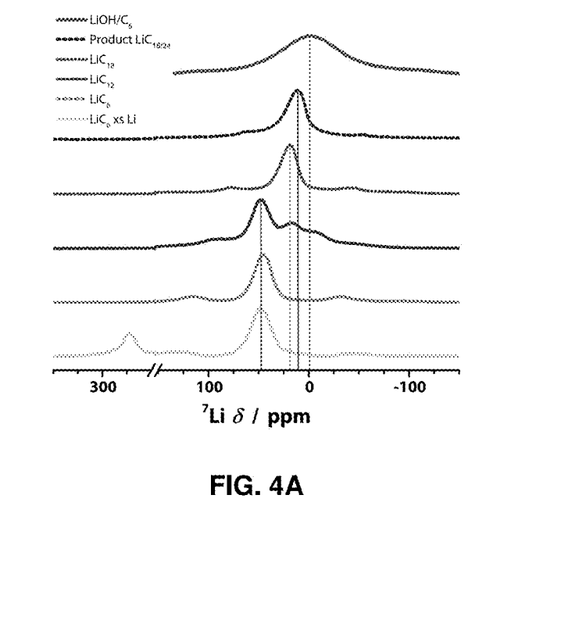
FIG. 4A is $^7$Li NMR and FIG. 4B is XRD spectra of lithiated graphites and the end product of $LiC_6$'s reaction with ambient air.
Figure 4B:
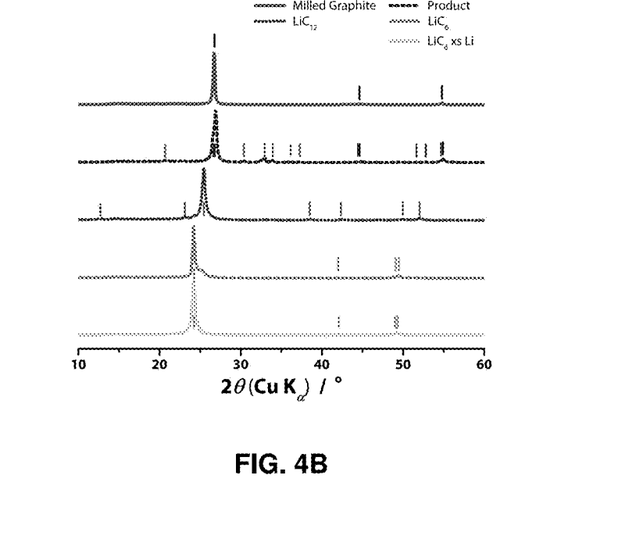

FIG. 4 is $^7$Li NMR (A) and XRD (B) spectra of lithiated graphites and the end product of $LiC_6$'s reaction with moisture. Vertical lines in the NMR spectra guide the eye with respect to peak position changes. Vertical lines in the XRD spectra mark refined peaks of the product. Legends are displayed in plots. The NMR and XRD spectra of the milled $LiC_6$ and $LiC_{12}$ shown in FIG. 4 match recorded spectra of electrochemically synthesized Li-graphites demonstrating high purity lithiated materials are synthesized.

When an excess amount of Li (>25 wt. %) was added to the $LiC_6$ preparation, the Li metal resonance is observed at 270 ppm, FIG. 4A. The XRD of the excess lithiated product showed no diffraction peaks from Li metal and therefore is identical to $LiC_6$ (FIG. 4B). Assuming that the excess lithium is evenly spread out on the surface of the $LiC_6$ particles, the Li layer thickness is estimated at 5-10 nm.

NMR is insensitive to the chemical nature of the Li-salt product, however the product contains broad diffraction peaks matching those from LiOH and LiOH.H$_2$O. Rietveld refinement gave mass fraction composition of 0.19, 0.28, and 0.63, corresponding to $LiC_{24}$, LiOH(.H$_2$O), and graphite. Assuming that $^{14}\!/_{15}$th of the intercalated Li reacts forming LiOH and leaving behind $LiC_{24}$, the mass fraction of $LiC_{24}$, LiOH, and graphite would be 0.19, 0.24, and 0.57, respectively, in good agreement with the spectral fitting. The overall mass balanced equation can be written as:

(graphite)

Figure 5A:
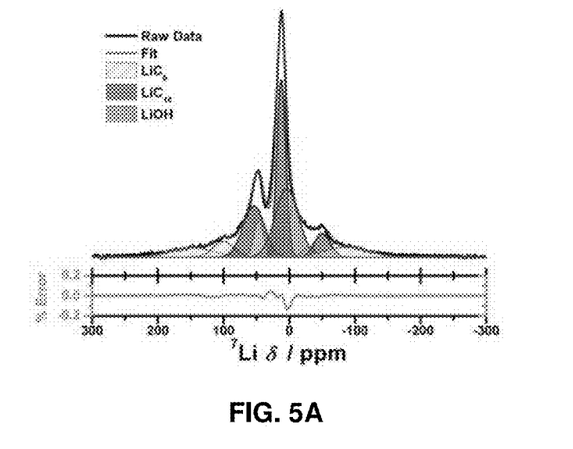
FIG. 5A is fitted end-product's NMR spectrum from $LiC_6$ hydrolysis with peaks for $LiC_6$, broad LiOH, and $LiC_{18/24}$.
Figure 5B:
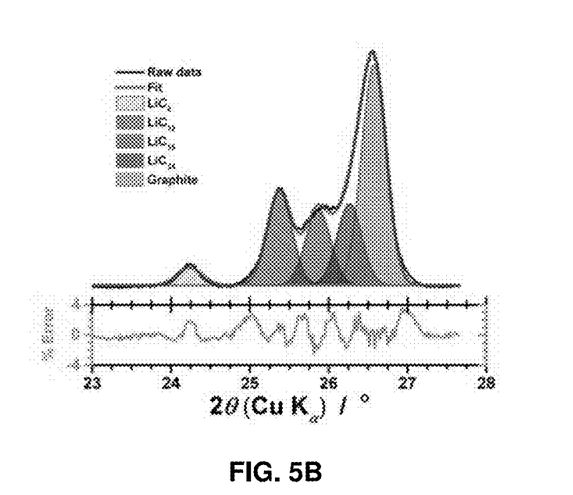
FIG. 5B is fitting of the product's XRD data of the (002) region to peaks indicative of major stages of lithiated graphite including raw graphite.

A high resolution NMR (A) and XRD (B) spectra of the SEI product are provided in FIG. 5. The resonances from the lithiated graphites, $LiC_6$ and $LiC_{18\text{-}24}$, both central and outer transitions, were fitted in addition to the broad signal from the lithium hydroxides for each spectrum. The integrated peak intensities from the deconvolution of each spectrum were used to provide molar ratios of the Li species. There is little loss of total Li signal, that is, all the Li species are accounted for. The (002) XRD scattering signals were fitted and plotted their area in FIG. 5B. The figure shows that not all of the lithium is removed from the anode material.

The small-angle neutron scattering (SANS) of a spontaneously formed solid-electrolyte interphase was also measured to provide information on particle's SEI coverage and subsequent particle agglomeration. Here a lithiated organic layer coats the graphite particles filling in micro-pores and is polymeric in nature being 1-3 nm thick. An inelastic neutron scattering was used to probe the chemistry, and it was found that the SEI showed similar inelastic scattering to polyethylene oxide.

$Li_xC_6$ also reacts spontaneously with ethylene carbonate (EC)/dimethyl carbonate (DMC) solution as a model system for SEI growth by focusing on the differences in the porosity and surface area due to SEI formation. The SEI is larger in $LiC_6$ than in $LiC_{12}$, and there is little inorganic carbonate formed. The initially rough surfaces, which exhibit surface fractal scattering, become smoother due to the formation of 1-2 nm size SEI domains and exhibit nearly mass fractal scattering. The particles become more interconnected. The formation of SEI appears to block access of solvent molecules into micropores as unfilled nanoscale spaces remain in the reacted samples.

The infrared adsorption of synthesized $Li_2(CH_2OCO_2)_2$ has been compared by others with the electrochemical reduction of EC and strong evidence has been found for it being the primary product. If the intercalated Li has access to surface sites, it will act as a reducing agent (E=0.05 V vs. Li/Li$^+$) on EC to form carbonate, ethylene gas, and intermediate radical species that can polymerize via:

Therefore, it is expected that the surface layer is a mixture of $Li_2CO_3$ and $Li_2(CH_2CH_2CO_3)_2$, with the latter representing the polymeric component of the SEI.

Samples were prepared by soaking $Li_xC_6$ and raw graphite (0.3 g) in deuterated or protiated EC/DMC solution, (3:7 wt. %) for 3 days. Excess solvent was removed in vacuo for over 5 h at pressures less than 1×10$^{-4}$ Torr. The raw graphite control experiment found no evidence of scattering due to residual EC, i.e. EC is fully sublimed under these conditions. The lithiated samples showed a mass increase compared to the initial $Li_xC_6$ mass after reaction with the carbonate solution. The raw graphite showed no mass change, indicating both no reaction and complete solvent removal. As with the reaction with moisture, the LixC6 reaction with EC/DMC showed a loss of LiC6 signals and the formation of higher stages.

The neutron scattering techniques were used to investigate the solid electrolyte interphase that forms on battery materials. The SEI is a complicated system, but can be simplified by chemically lithiating graphite, increasing its surface area, and then exposing it to select solvents in order to reconstruct the SEI piecewise. Ball milling the graphites produced ordered nanodomains, which allowed for increased SANS scattering intensity from SEI and solvent filling in the voids. Starting with the assumption that the SEI was formed from the sole reaction with EC to produce a combination of $Li_2CO_3$ and $Li_2(EC)_2$, the resulting SANS data was fitted to show that a mostly organic layer coats the lithiated particles and fills inter-grain voids. INS was utilized to obtain chemical information on the layer. It was shown that EC has a stronger interaction with the surface of lithiated graphite due to the formation of a 1-3 nm thick SEI.

Figure 6:
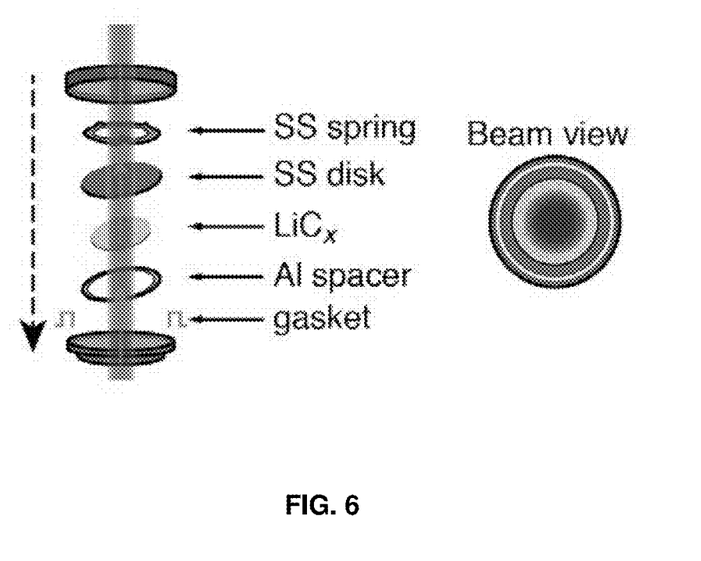
FIG. 6 is a schematic diagram depicting a coin cell construction and sealing for the SANS experiment.

The sample holder was a CR2023 stainless steel (SS) coin cell (FIG. 6) as per Bridges et al. Between 0.15 and 0.3 g of the powdered sampled was packed into an aluminum spacer ring. The direction of crimping action is given by arrow and other arrows give the incident beam direction. A SS disk and spring were placed atop the sample and the cell was hermetically sealed with a coin cell crimper. All sample coin cells including an empty one for background subtractions were loaded on a multi-sample translation stage at the General-Purpose Small-Angle Neutron Scattering Diffractometer (GP-SANS) located on beam line CG-2 at the High Flux Isotope Reactor (HFIR), Oak Ridge National Laboratory. Measurements were carried out in transmission geometry and an 8 mm-diameter beam size.

Figure 7A:
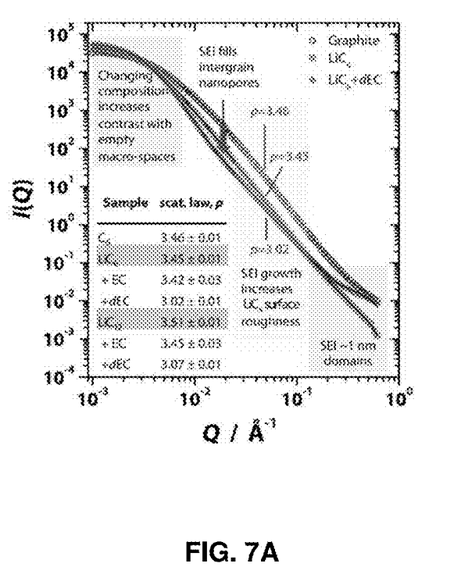
FIG. 7A is scattering curves of graphite, $LiC_6$, and $LiC_6$+d-EC. The inset table summarized scattering power law of all samples showing that the formed SEI roughens the surface of the graphite particles.

The scattering intensity, I(Q), is reported as a function of the absolute value of the scattering vector, or momentum transfer, defined as $$\frac{4\pi \sin\theta}{\lambda},$$

where λ is the neutron wavelength and θ is half the scattering angle. In the SANS I(Q)-Q curves shown in FIG. 7 the size in real space of the observed features scales with 1/Q, i.e. the large features appearing at small Q, and vice versa. In the pristine lithiated and non-lithiated graphite samples, the SANS signal originates from scattering by the graphite-air interface and the nanoscale pore spaces between the milled particles. The signal strength is modulated by the difference in the neutron scattering length density (NSLD), $\rho^*$, between the graphite and the empty pore space such that $I(Q) \propto (\Delta\rho^*)2$. The NSLD is calculated from the sum of the coherent scattering lengths of all the atoms in a given phase.

Filling of the close-contact inter-grain voids is observed as a decrease in I(Q) near Q=0.014 Å$^{-1}$ (arrow in FIG. 7). The increase in scattering at Q>0.2 Å$^{-1}$ is consistent with ≈1 nm-size domains in the SEI. The changes in I(Q) at Q<0.01 Å$^{-1}$ reflectthe change in the carbon/SEI system composition in comparison to the surrounding macrospaces; only qualitative comparisons are made here since this part of the SANS signal is convoluted with some degree of multiple scattering.

Figure 7B:
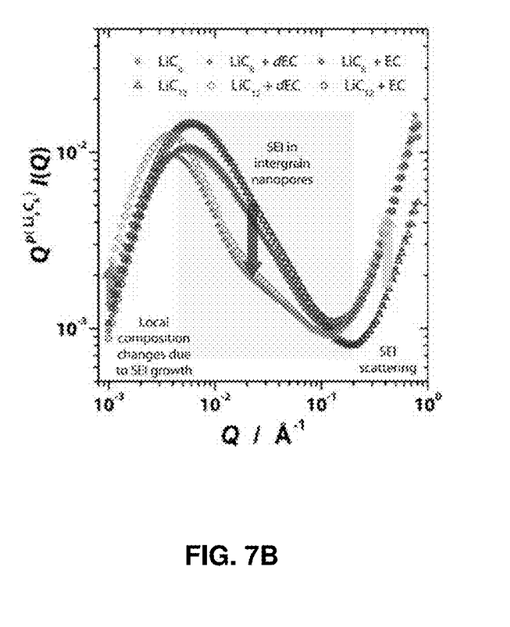
FIG. 7B is SANS curves normalized by $Q^{p^{(Li_xC6)}}$ highlight changes at the inter-grain pore scales due to agglomeration.

The changes at the micropores are highlighted by normalizing I(Q) to the power law of pristine $Li_xC_6$, $Q_p(Li_xC_6)$, obtained from FIG. 7. Proceeding from high to low Q, the normalized scattering intensity of the reacted samples increases between 0.2-0.8 Å$^{-1}$. This is due to formation of SEI within nanodomains along the surface of the $Li_xC_6$. Fitting a sphere form factor—discussed below—with a power law background yields a size radial increase between 0.8 and 1 nm in this range (see FIG. 3). That is, the carbon particles become larger due the SEI. This is in agreement with various post mortem analyses of the SEI formation in Li-ion batteries by electron microscopy and qualitatively similar to the SANS results of Bridges et al. However, a number of in situ experiments show that the SEI can be thicker, upwards to 100 nm when formed at high overpotentials and with the presence of excess electrolyte.

Within the mid-Q range (0.005-0.1) there is a decrease in scattering in the deuterated SEI layer. The signal near 0.014 Å$^{-1}$ is proportional to the square of the NSLD difference between the carbon substrate and the contents of the pore space:

$$I(Q = 0.014 \text{ Å}^{-1}) = A/m_{Cx} \times (\Delta\rho^*)^2$$
$$= A/m_{Cx} \times (\rho^*_{LiCx} - \rho^*_{pore})^2$$

where A is a constant determined from the pristine sample scattering, and $m_{Cx}$ is the carbon mass of the $Li_xC_6$ substrate used for normalization. The signal from deuterated components in the inter-grain pore spaces is lower than from protiated components. This and the large difference between the scattering from the deuterated and protiated products suggest that the SEI is primarily organic in nature. In other words, formation of $Li_2CO_3$ is less favorable or kinetically slower than polymer formation.

Figure 8:
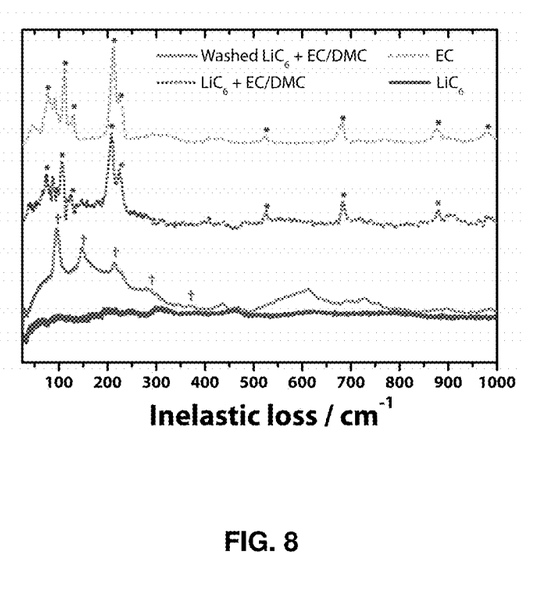
FIG. 8 is inelastic neutron scattering of $LiC_6$+EC/DMC, ethylene carbonate, and washed $LiC_6$+EC/DMC demonstrating the polymer nature of the passivation layer.

Inelastic neutron scattering (INS) conducted on beam line 16B (VISION) at the Spallation Neutron Source (SNS, ORNL) is sensitive to vibrational modes involving the protons in the sample and possesses no selection rules. Therefore if the layers were primarily organic, then bands from the layer would be visible. FIG. 8 shows the INS spectra of EC, $LiC_6$, and $LiC_6$ with the SEI formed by reaction with EC/DMC. Dashed lines correspond to strong peaks from leftover material in the washed sample. Major peaks at 110 and 210 cm$^{-1}$ are from molecular rocking and ring bending of EC, respectively. Excessive washing of the graphite with DMC removes the EC and reveals new peaks at 92 and 150 cm$^{-1}$. These peaks are similar to those of polyethylene oxide (PEO) which is expected if the SEI is more polymeric in nature. However, the hydrogen containing vibrational bands in $Li_2(EC)_2$ overlap with to those of EC, which again, overlap to those of an extensive polymer like PEO. As such, this makes it difficult to come to a definitive chemical identification.

Figure 9A:
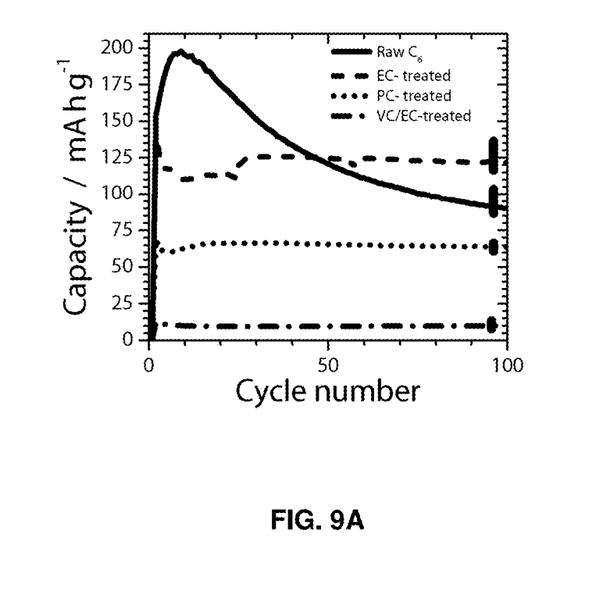
FIG. 9A is the Capacity curves obtained during the first 100 cycles demonstrating the superior performance of a representative sample of pretreated anodes over typical untreated anodes.
Figure 9B:
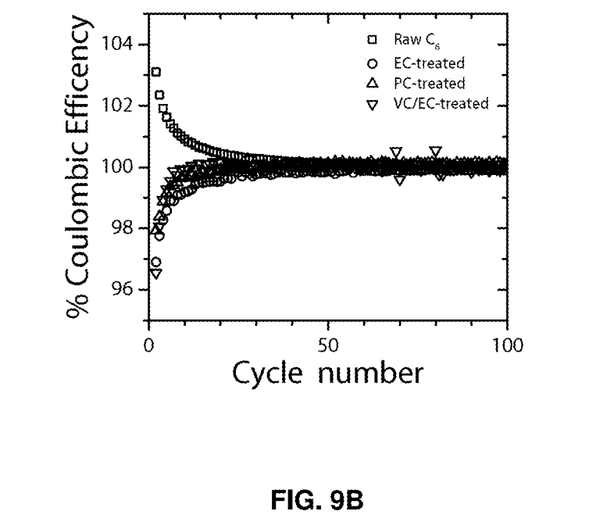
FIG. 9B is the Coulombic efficiency during the first 100 cycles of a representative sample of pretreated anodes and an untreated graphite anode.

An example of the typical cell performance of a pre-passivated lithiated anode is provided in FIGS. 9A and 9B. Separate samples of $LiC_6$ were exposed to 1 M EC in tetrahydrofuran (THF), 1 M PC in THF, and 0.5 M EC, 0.5 M VC in THF. The powders were washed three times with THF, filtered and dried in vacuo. The powders were mixed with EPDM/cyclohexane binder system composed of a suspension mixture of 90 wt. % pretreated anode material, 5 wt % EPDM and 5 wt % carbon black. The total mass of the powders and polymer binder was 1 g which was added to at least 2 g of cyclohexane. The suspension was casted onto a copper foil current collector under an inert Argon atmosphere and the residual solvent was removed in vacuo for at least 3 h.

Electrochemical testing was carried out in half-cell configuration using CR2032 coin cells prepared in an Ar-filled glovebox with Celgard 2325 separator and Li metal counter electrode. The electrolyte used was 1.2 M LiPF6 (sigma-Aldrich, battery grade) in 3:7 wt. % EC/DMC (Sigma-Aldrich, 99%) The potential limits for galvanostatic testing (Maccor 4000 cycler) were 0.01 to 1.5 V. the initial lithiation-delithiation cycle was carried out at a C/10 rate then the cells were cycled at 1 C for 100 cycles.

FIGS. 9A and 9B show that the pretreated anode powders required little to no "break-in" period, that is to say their performance showed no degradation in the first tens of cycles when compared to the untreated graphite. In fact the capacity of the untreated graphite continued to decay after 100 cycles while for all the treated anodes the capacity remained fixed after 20 to 30 cycles. The coulombic efficiencies of all the treated graphite anodes were similar after twenty cycles and were over 99.99%. It took the untreated graphite over 40 cycles to arrive at a stable the coulombic efficiency.

Ranges: throughout this disclosure, various aspects of the invention can be presented in a range format. It should be understood that the description in the range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range for example, 1, 2, 2.7, 3, 4, 5, 5.3 and 6. This applies regardless of the breadth of the range.

This invention can be embodied in other forms without departing from the spirit or essential attributes thereof, and accordingly, reference should be had to the following claims to determine the scope of the invention.

We claim:

1. A particulate electrode material for use in forming a battery electrode, comprising a particulate lithium active material composition, the particulate lithium active material composition comprising the reaction product of lithium and an particulate active anode material, the lithium active material comprising at least one selected from the group consisting of $LiC_6$, $LiC_{12}$, $LiC_{18}$, $LiC_3N_4$, $Li_xSi$ where $0<x<4$, $LiTi_2C_3$, $Li_xSn$, and $Li_xSb$, the particulate lithium active material composition being completely coated with a lithium ion conducting passivating material having a transference number of from 0.7 to 1.0, the lithium ion conducting passivating material coating being from 1 to 100 nm thick, wherein the particulate electrode material is lithiated and pre-passivated.

2. The particulate electrode material of claim 1, wherein the active material comprises at least one selected from the group consisting of C, Si, Sn, SnO, Sb, Mo—Sb, Cu—Sb, Cu—Sn, and $TiO_2$.

3. The particulate electrode material of claim 1, wherein the active material comprises at least one selected from the group consisting of graphite and amorphous carbon.

4. The particulate electrode material of claim 1, wherein the lithium ion conducting passivating material comprises at least one selected from the group consisting of ethylene carbonate, propylene carbonate, fluoroethylene carbonate and vinylene carbonate.

5. The particulate electrode material of claim 1, wherein the passivating coating comprises at least one selected from the group consisting of lithium carbonate, lithium fluoride, polycarbonates such as polyethylene oxides, poly carbonates, and copolymers thereof; and lithium alkyl carbonate salts such as lithium alkyl carbonates including lithium alkyl dicarbonate, dilithium butylene dicarbonate, and all their fluorinated counter parts sulfones, cyanides, acetonitrile, glymes (di, tri, tetraglyme) dioxolane and NMP.

6. The particulate electrode material of claim 1, further comprising an outer reflective coating over the passivating coating.

7. The particulate electrode material of claim 6, wherein the reflecting coating comprises gold.

8. An electrode, comprising:
a particulate electrode material, comprising a particulate lithium active material composition, wherein the lithium active material composition comprises at least one selected from the group consisting of $LiC_6$, $LiC_{12}$, $LiC_{18}$, $LiC_3N_4$, $Li_xSi$ where $0<x<4$, $LiTi_2C_3$, $Li_xSn$, and $Li_xSb$, the lithium active material composition being completely coated with a lithium ion conducting passivating material having a transference number of from 0.7 to 1.0, the lithium ion conducting passivating material coating being from 1 to 100 nm thick; and,
a binder for binding the electrode material together to form a lithiated and pre-passivated electrode.

9. The electrode of claim 8, wherein the binder is UV curable.

10. The electrode of claim 8, wherein the binder comprises at least one selected from the group consisting of polyvinylidene fluoride (PVDF) and ethylene propylene diene terpolymer (EPDM).

11. The electrode of claim 8, wherein the active material comprises at least one selected from the group consisting of C, Si, Sn, SnO, and $TiO_2$.

12. The electrode of claim 8, further comprising an outer reflective coating over the passivating coating.

13. A battery, comprising:
a lithiated and pre-passivated anode comprising a particulate electrode material, comprising a particulate lithium active material composition, wherein the lithium active material composition comprises at least one selected from the group consisting of $LiC_6$, $LiC_{12}$, $LiC_{18}$, $LiC_3N_4$, $Li_xSi$ where $0<x<4$, $LiTi_2C_3$, $Li_xSn$, and $Li_xSb$, the particulate lithium active material composition being completely coated with a lithium ion conducting passivating material having a transference number of from 0.7 to 1.0, the lithium ion conducting passivating material coating being from 1 to 100 nm thick, the anode further comprising a binder and a current collector;
a cathode;
a separator; and
an electrolyte.

* * * * *